United States Patent [19]

Mayo, Jr. et al.

[11] 4,047,831

[45] Sept. 13, 1977

[54] METHOD FOR REDUCING HYDRAULIC TURBINE SEAL TEMPERATURE WHILE TURBINE RUNNER IS ROTATING IN AIR

[75] Inventors: Howard A. Mayo, Jr.; Ignacy Swiecicki, both of York, Pa.

[73] Assignee: Allis-Chalmers Corporation, Milwaukee, Wis.

[21] Appl. No.: 768,758

[22] Filed: Feb. 14, 1977

Related U.S. Application Data

[63] Continuation of Ser. No. 631,487, Nov. 13, 1975, abandoned.

[51] Int. Cl.² .................... F04D 29/08; F04D 29/58; F01D 25/08
[52] U.S. Cl. ...................................... 415/1; 415/116; 415/175; 277/1
[58] Field of Search .................. 415/1, 112, 116, 175; 277/1, 15 R, 72 R

[56] References Cited

U.S. PATENT DOCUMENTS

| | | | |
|---|---|---|---|
| 3,279,378 | 10/1966 | Sproule | 415/112 UX |
| 3,658,436 | 4/1972 | Oishi et al. | 415/1 |
| 3,945,754 | 3/1976 | Hagiya et al. | 415/1 |
| 4,014,624 | 3/1977 | Takase et al. | 415/1 |

*Primary Examiner*—Carlton R. Croyle
*Assistant Examiner*—Donald S. Holland
*Attorney, Agent, or Firm*—John P. Hines

[57] ABSTRACT

A method is disclosed for admitting high pressure air to the seals of a hydraulic turbine runner which is rotating in a gas such as air. The high pressure air reduces the temperature of the seal and at the same time maintains a desired air pressure in the runner casing. Means are also provided to permit evacuation of air or gas from the runner casing to reduce the pressure therein below atmospheric pressure to decrease the windage losses of the rotating runner and permit lower pressure cooling air or gas to be applied to the runner seals.

3 Claims, 1 Drawing Figure

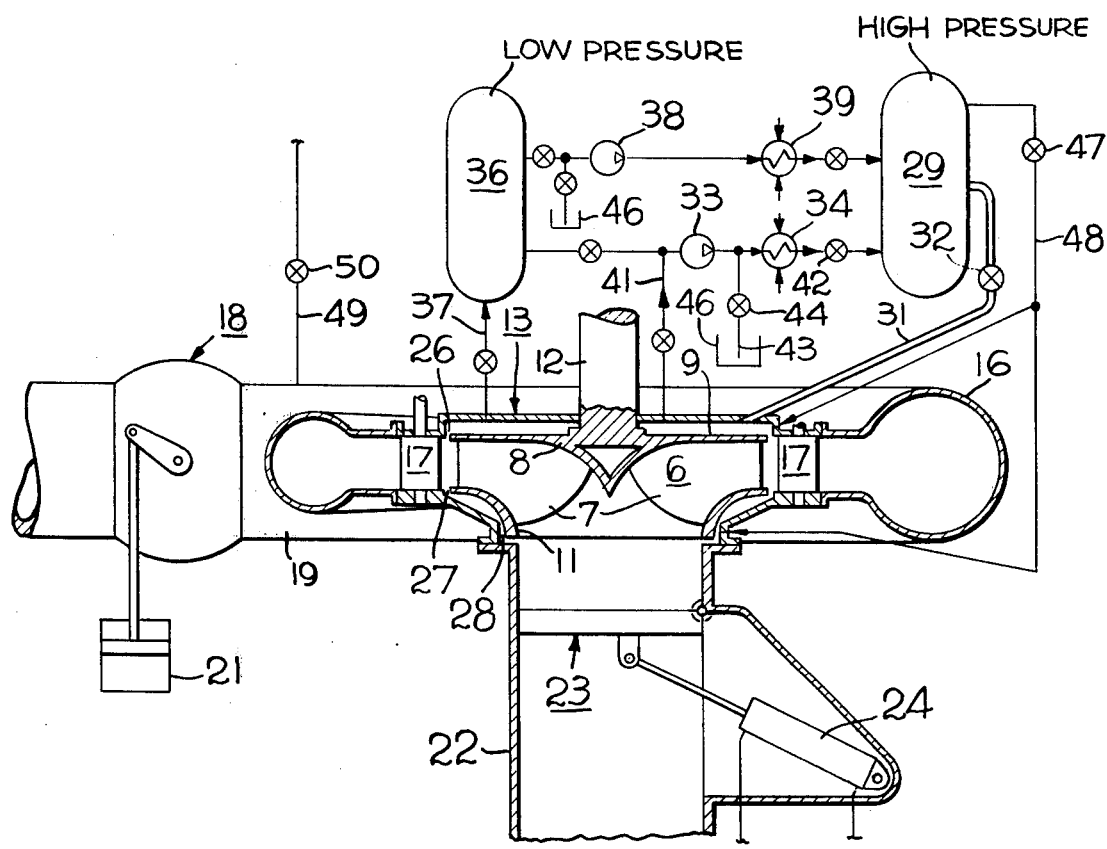

METHOD FOR REDUCING HYDRAULIC TURBINE SEAL TEMPERATURE WHILE TURBINE RUNNER IS ROTATING IN AIR

This is a continuation of application Ser. No. 631,487 filed Nov. 13, 1975; now abandoned.

This invention pertains to hydraulic turbines in general and more particularly to a method for decreasing the losses of a turbine runner rotating in air.

In certain instances it is desirable to rotate a hydraulic turbine runner when the turbine is not being utilized to produce electric power. As an example, it is sometimes advantageous to operate a generator, which is normally driven by the hydraulic turbine, as a motor for the purpose of utilizing the inductive capacity of the generator to improve the power factor of the electric distribution line. When the generator is so used as a synchronous condenser, only wattless power should be drawn from the line. The work to be done by the generator should therefore be minimized and should be limited to overcome friction and windage in the generator and the turbine. The work required to motor the generator can be decreased substantially by dewatering the turbine and rotating the runner in air. Since modern hydraulic turbines and pump-turbines are usually located below tail-water levels, this is accomplished by depressing the water level below the level of the runner by admitting pressurized air into the turbine runner casing.

However, when the turbine is rotating in air the water normally passing through the turbine is not available for cooling the runner seals. If the seals are not properly cooled the temperature of the adjacent surfaces of the seals increases causing expansion, and in some instances the seals actually contact and seize. When seizure does occur excessive damage usually results. Furthermore, seizure of the runner seals usually requires an expensive and time consuming major dismantling of the turbine including removal of the runner to free the seized seal elements.

In order to overcome this problem of excessive heating of the runner seals, it has been the practice in the past to spray water on the seals while the runner is rotating in air. However, when cooling water is sprayed on the seals it collects in the runner casing adding additional drag and therefore requiring more work to rotate the runner.

It is therefore the intention and general object of this invention to provide a method for rotating a hydraulic turbine runner in air or a low density gas whereby the seals can be cooled without adding to the drag on the rotating runner.

A more specfic object of the subject invention is to provide a method of the hereinbefore described type wherein air or a lower density gas such as helium or hydrogen is utilized to cool the runner seals.

An additional object of the subject invention is to provide a method of the hereinbefore described type wherein the air or gas pressure in the runner casing is reduced below tail-water or atmospheric pressure to further lessen the drag on the runner.

These and other objects of the subject invention will become more fully apparent as the following description is read in light of the attached drawing which shows a schematic view of a turbine constructed to perform the method of this invention.

Referring to the drawing, a hydraulic turbine of the Francis type is disclosed. The runner 6 is composed of a plurality of circumferentially spaced vanes 7 which are connected to a hub 8 and to a crown 9 and band 11. The runner 6 is supported on a shaft 12 which extends upward and is connected to a generator (not shown) in the conventional manner.

The turbine runner 6 is supported for rotation within a casing generally designated 13 which in the conventional manner is supported in concrete (not shown). A spiral casing 16 which is also conventionally embedded in concrete (not shown) is open to the turbine runner 6 through a plurality of circumferentially spaced wicket gates 17. The wicket gates in the conventional manner are rotatable between open and closed positions to substantially interrupt and permit the flow of water from the spiral case to the runner. For complete shutoff of the water from the penstock (not shown) to the runner an intake valve generally designated 18 may be provided in the intake passage 19 to the spiral case. The intake valve 18 is operated by a hydraulic servomotor 21.

As the water passes through the turbine runner 6 it discharges through a draft tube 22. In order to completely isolate the runner from the water in the tail race (not shown) a discharge valve generally designated 23 may be provided. This valve also is in the conventional manner operated by a hydraulic servomotor 24.

In order to insure a high percentage of water passing through the turbine runner vanes, runner seals are provided. Crown seals 26 are provided between the runner crown 9 and the turbine casing 13 and band seals 27 and 28 are provided between the band 11 and the casing.

A high pressure air or low density gas tank 29 having sufficient volume to depress the water from the casing is connected to the turbine casing through a large pipeline 31. A valve 32 is provided in this line to shut off the flow of gas once the water has been depressed from the runner. A compressor indicated at 33 is utilized to supply the pressurized air or gas to the high pressure tank 29. An intercooler 34 may be provided between the compressor and the tank 29 to cool the compressed gas.

The method of practicing the invention is described as follows. The wicket gates 17 are moved to the closed position. The valve 32 is opened permitting a large volume of high pressure air or gas to enter the turbine casing 13 and depress the water from about the runner through the draft tube 22. Once the runner has been dewatered the valve 32 is closed cutting off the large volume supply of high pressure gas. At the same time the valve 47 is opened permitting gas to flow through the pipeline 48 and the branch lines to the crown seals 26 and the band seals 27 and 28. This cooling gas is at a sufficient pressure so that when it expands through the crown and band seals it will cool these seals sufficiently so they will not expand to the point of contact. Additionally, the cooling gas is provided in sufficient quantity and pressure to insure that the pressure in the casing is maintained at a level to prohibit the depressed water from flowing back into the casing.

In certain installations it may be desirable to provide a low pressure air or gas tank 36 in gas communication with the turbine casing. The excess gas provided to the casing to cool the seals can then flow under its own pressure into the low pressure tank 36 through pipeline 37 from the crown and band chambers of casing 13. An additional compressor 38 and cooler 39 may also be provided to insure sufficient volume in the high pressure tank.

In certain instances it may be desirable to decrease the pressure of the air or gas in the runner casing below tail-water or atmospheric pressure. This can be accomplished by depressing the water from the casing in the manner described above. After the water is depressed both the intake and discharge valves 18 and 23 are closed. Exhaust line 41 connects the interior of the turbine casing 13 with the intake to compressor 33. A valve 42 may be closed when air is used to prohibit discharge from the compressor 33 into the high pressure tank 29. An additional pipeline 43 from the discharge of compressor 33 including a valve 44 is opened to the atmosphere indicated as a sump 46. In this manner the compressor 33 is permitted to evacuate air directly from the turbine casing to atmosphere and reduce the pressure therein below tail-water or atmospheric pressure. When this is accomplished the wind resistance to rotation of the runner is decreased and the temperature of the crown and band seals is decreased because of lower wind friction. In certain instances the pressure in casing 13 may be reduced to the point where atmospheric air flowing through vent pipe 49 and valve 50 into the spiral casing 16 through gates 17 to the seal openings is sufficient to cool the seals. In this event valve 47 would be closed isolating high pressure tank 29.

From the above description it can be seen that a method of operating a hydraulic turbine runner in air or a low density gas has been disclosed which decreases the horsepower loss. Furthermore, the conventional air pressure system which is usually used to supply air to depress the water from the runner can be utilized with minor modification to cool the runner seals and to evacuate air or a low density gas from the runner casing to permit the runner to rotate in air or a low density gas below tail-water or atmospheric pressure.

The embodiments of the invention in which an exclusive property or privilege is claimed are defined as follows:

1. In a hydraulic turbine including a stationary portion defining a runner chamber with a runner supported therein and rotated by water flowing through a water intake valve acting on the runner, crown and band seals located between said runner and the stationary portion of said machine, said seals during normal operation being cooled by contact of said water, and wicket gates on the upstream side of said runner capable when in the closed position to substantially interrupt the flow of water into said chamber, said runner chamber being less than airtight, the method of rotating said runner and gas to reduce runner drag comprising the steps of:
    a. closing said intake valve;
    b. admitting a relatively large volume of high pressure gas to said runner chamber through a first passageway sufficient to depress the water from said chamber;
    c. interrupting the flow of said relatively large volume of high pressure gas to said runner chamber; and
    d. admitting a relatively small volume of high pressure gas to said runner chamber through a second passageway directly through the crown and band seals to cool said seals and replenish the leakage gas to maintain the desired gas pressure in said chamber.

2. In a hydraulic turbine including a stationary portion defining a runner chamber with a runner supported therein and rotated by water flowing through a water passage acting on the runner, seals located between said runner and the stationary portion of said machine, said seals during normal operation being cooled by contact of said water and intake and discharge valves located respectively on the upstream and downstream side of said runner and capable in the closed position to substantially isolate said runner chamber from upstream and downstream water, said isolated runner chamber being less than airtight, the method of rotating said runner in gas to reduce runner drag comprising the steps of:
    a. closing said intake valve;
    b. admitting a relatively large volume of high pressure gas to said runner chamber sufficient to depress the water from said chamber;
    c. closing said discharge valve;
    d. interrupting the flow of said relatively large volume of high pressure gas to said runner chamber;
    e. evacuating gas from said runner chamber to lower the gas pressure therein below the pressure on the downstream side of said discharge valve, and
    f. admitting a relatively small volume of high pressure gas to said runner chamber through the runner seals to cool said seals and replenish the leakage gas to maintain the desired gas pressure in said chamber.

3. The method set forth in claim 2 wherein said gas in step (f) is atmospheric air.

* * * * *